(12) United States Patent
Bruton et al.

(10) Patent No.: US 6,456,745 B1
(45) Date of Patent: Sep. 24, 2002

(54) METHOD AND APPARATUS FOR RE-SIZING AND ZOOMING IMAGES BY OPERATING DIRECTLY ON THEIR DIGITAL TRANSFORMS

(75) Inventors: Leonard Thomas Bruton, Calgary (CA); Todd Simpson, Calgary (CA); Barry Yee, Calgary (CA)

(73) Assignee: Push Entertaiment Inc., Calgary (CA)

( * ) Notice: Subject to any disclaimer, the term of this patent is extended or adjusted under 35 U.S.C. 154(b) by 0 days.

(21) Appl. No.: 09/154,227

(22) Filed: Sep. 16, 1998

(51) Int. Cl.$^7$ ................................................ G06K 9/32

(52) U.S. Cl. ...................................... 382/298; 382/276

(58) Field of Search ................................ 382/298, 250, 382/232, 233, 240, 282, 248, 300, 294, 276; 345/127, 667, 163, 347; 348/93

(56) References Cited

U.S. PATENT DOCUMENTS

| | | | |
|---|---|---|---|
| 5,051,927 A | | 9/1991 | Tada et al. .................... 364/521 |
| 5,168,375 A | | 12/1992 | Reisch et al. ................ 358/432 |
| 5,227,875 A | | 7/1993 | Suu et al. ..................... 358/133 |
| 5,477,397 A | | 12/1995 | Naimpally et al. ......... 360/10.3 |
| 5,495,292 A | * | 2/1996 | Zhang et al. ................ 348/407 |
| 5,519,452 A | * | 5/1996 | Parulski ....................... 348/620 |
| 5,552,824 A | * | 9/1996 | Deangelis et al. ........... 348/157 |
| 5,574,508 A | * | 11/1996 | Diamant ...................... 348/511 |
| 5,596,346 A | * | 1/1997 | Leone et al. ................. 345/127 |
| 5,604,494 A | * | 2/1997 | Murakami et al. ............ 341/50 |
| 5,619,738 A | * | 4/1997 | Petruchik et al. ............ 396/311 |
| 5,649,032 A | * | 7/1997 | Burt et al. .................... 382/284 |
| 5,652,849 A | * | 7/1997 | Conway et al. .............. 395/327 |
| 5,706,216 A | * | 1/1998 | Reisch .................... 364/715.02 |
| 5,729,673 A | * | 3/1998 | Cooper et al. ............... 395/127 |
| 5,774,598 A | * | 6/1998 | Sunshine et al. ............ 382/250 |
| 5,990,890 A | * | 11/1999 | Etheredge .................... 345/347 |
| 6,154,762 A | * | 11/2000 | Malvar ........................ 708/400 |
| 6,298,166 B1 | * | 10/2001 | Ratnakar et al. ............. 382/248 |

FOREIGN PATENT DOCUMENTS

| | | | |
|---|---|---|---|
| EP | 0740269 | 10/1996 | ............. G06T/3/40 |
| JP | 4-239294 | * 9/1992 | .......... H04N/1/393 |
| WO | 9734420 | 9/1997 | .......... H04N/7/173 |

OTHER PUBLICATIONS

"Adaptive Motion Vector Resampling for Compressed Video Down–Scaling", by Bo Shen, et al.; IEEE; Jul. 1997; pp. 771–774.

"Circuits and Systems Letters", by P. Sathyanarayana, et al.; IEEE Transactions on Circuits and Systems, vol. 37, No. 5; May 1990; pp. 623–625.

"Manipulation and Compositing of MC–DCT Compressed Video", IEEE Journal on Selected Areas in Communications, US, IEEE Inc., New York, vol. 13, No. 1, pp. 1–11 XP000492740.

"Video Post–Production with Compressed Images", SMPTE Journal, US, SMPTE Inc., Scarsdale, New York, vol. 103, No. 2, pp. 76–84 XP000429905.

International Search Report, PCT/US99/21298.

* cited by examiner

*Primary Examiner*—Jose L. Couso
*Assistant Examiner*—Kanji Patel
(74) *Attorney, Agent, or Firm*—Fulbright & Jaworski L.L.P.

(57) ABSTRACT

Digital images are represented in the spatial domain by numbers that correspond to pixels and may be transformed to a transform domain image by means of a Transform Method. Other Transform Methods are used to transform the transform domain image back to the original spatial domain image. In this invention, these other Transform Methods are modified in such a way that the Modified Transform Method yields spatial domain images that are re-sized versions of the original spatial domain image. Methods are disclosed for employing the Modified Transform Method to implement zoomed and panned versions of the re-sized images. The re-sized images do not require pixel-level smoothing filters and other methods for removing image distortions due to re-sizing.

15 Claims, 7 Drawing Sheets

FIG. 4A
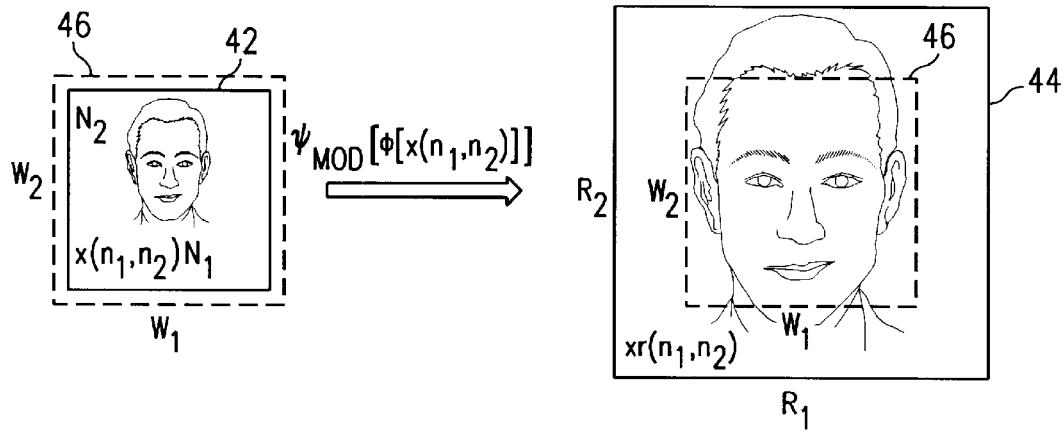
FIG. 4B
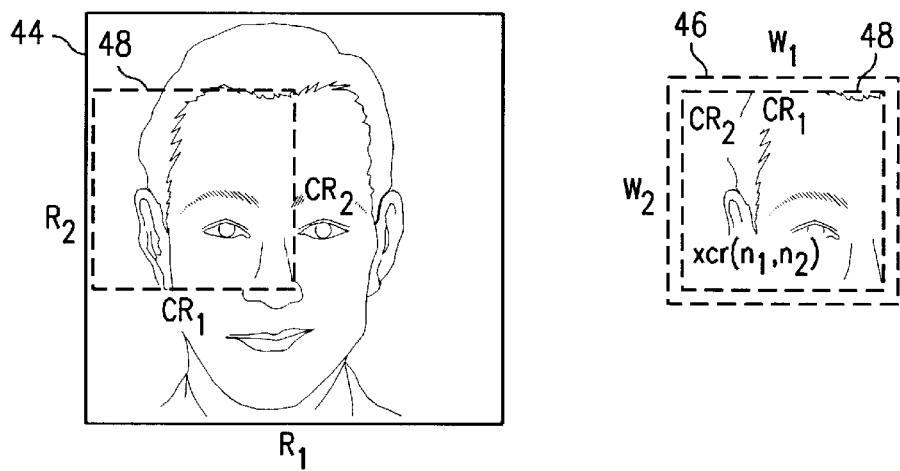
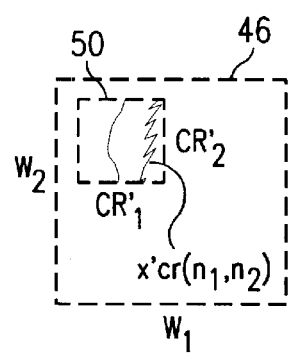
FIG. 4C

FIG. 5A
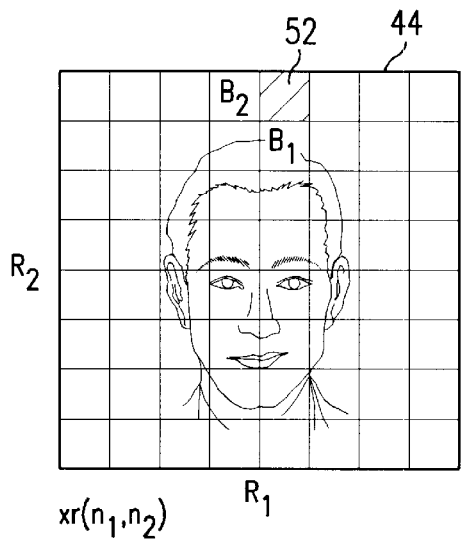
FIG. 5B
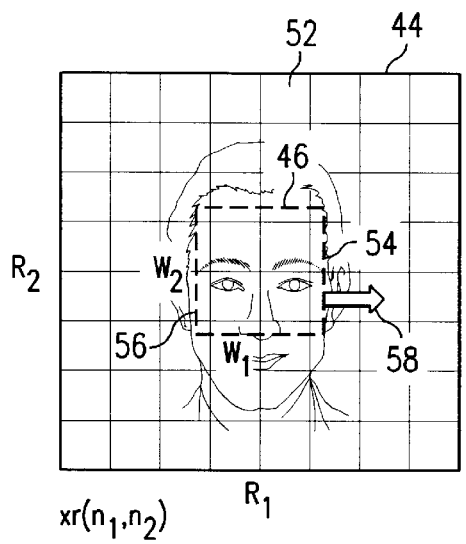
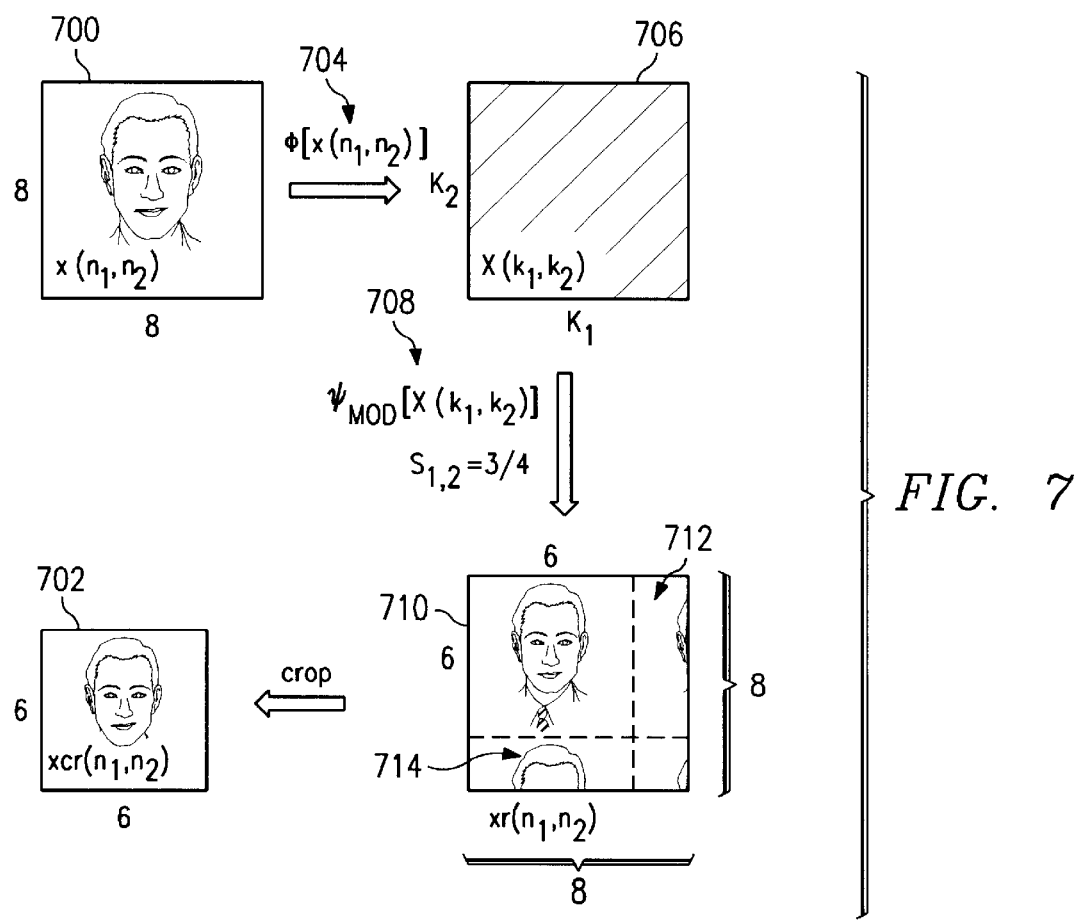
FIG. 7

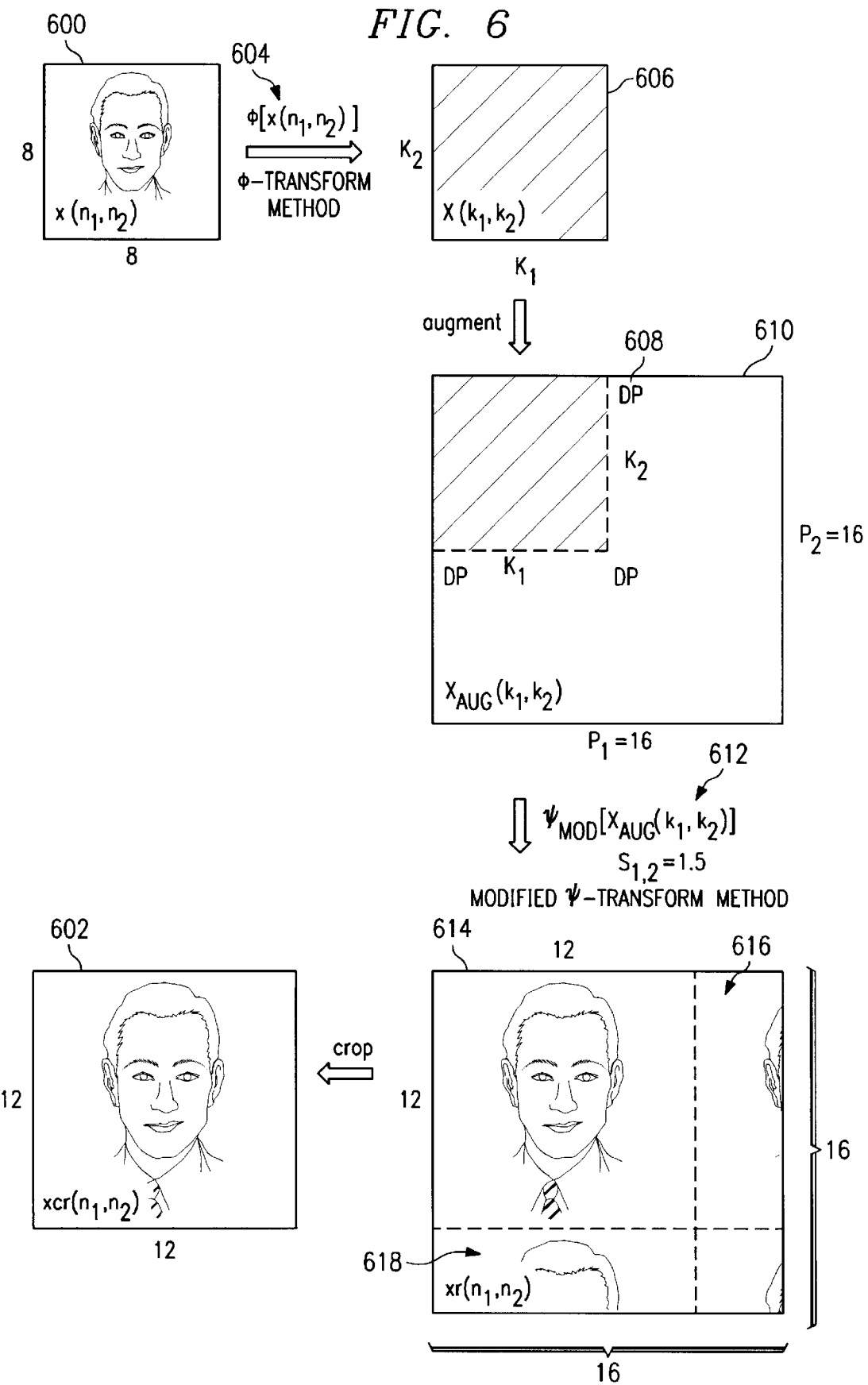

METHOD AND APPARATUS FOR RE-SIZING AND ZOOMING IMAGES BY OPERATING DIRECTLY ON THEIR DIGITAL TRANSFORMS

TECHNICAL FIELD OF THE INVENTION

This invention relates to video signal processing and more particularly to a method and system for re-sizing images and zooming into and out of images in a way that makes use of non-spatial interpretations of the images.

BACKGROUND OF THE INVENTION

Images can be imported into digital systems using opto-electronic transducing devices, such as video cameras and computer scanning devices. Also, images can be created within digital systems using a variety of computer software programs, such as drawing and animation programs. Images are commonly represented and stored in digital systems as arrays of digital numbers.

Images are typically displayed on a suitable display device, such as the cathode ray tube ("CRT") of a television or computer monitor, as a two-dimensional spatial representation on the surface of the display device. A series of slightly different images can be displayed in rapid temporal sequence in order to create the perception of smooth motion as, for example, in the case of television image sequences.

Pixels are relatively small localized fixed regions on the surface of the image display device. Displayed images are often composed of many thousands of pixels, wherein each pixel has attributes of size, shape, intensity and color. Objects within displayed images are represented by groups of pixels. Generally, the pixels are sufficiently close to each other on the surface of the display device to ensure that when the displayed image is viewed from a sufficient distance objects are perceived to have the same characteristics of shape, texture, edges and shading as similar objects in the real world.

Pixels are often, but not always, arranged on the surface of the display in the form of a rectangular grid consisting of uniform rows and columns of pixels. The horizontal and vertical spatial resolutions of an image are determined by the average number of pixels per unit of distance in the horizontal direction along the rows of pixels and in the vertical direction along the columns of pixels. The spatial resolution determines the minimum distance at which an image must be viewed so that the human vision system ("HVS") perceives objects within the image and not the individual pixels.

The spatial resolution of a displayed image can be increased by increasing the horizontal resolution and the vertical resolution. A high resolution image will yield a more natural looking approximation of an original real world image than a low resolution image. The quality of the image results from the HVS's perception of the lines and edges within displayed images. In low resolution images, the lines and edges are often perceived to be jagged because of the staircase effect caused by rectangular-shaped pixels in the displayed image.

The perception of jagged edges and lines, due to the staircase effect, is less discernible in high resolution images because of the reduced size of the rectangular-shaped pixels in the displayed image.

The finite resolution of the displayed image is a major factor limiting the faithfulness by which objects may be represented.

A digital image is a set of numbers where each number corresponds to a pixel of the displayed image. For example, a displayed image might consist of 512 by 640 pixels where each pixel is characterized by a range of possible luminous intensities and colors. If we decompose the color of each pixel into its primary colors of red ("R"), blue ("B") and green ("G"), then the displayed image may be numerically represented as the combination of the R, B and G component images. Each of the R, B and G component images is a monochromatic image in which each pixel is characterized only by a digital number representing the luminous intensity of the pixel. A displayed image, consisting of a rectangular array of pixels, may therefore be represented as three monochromatic component images, each of which may be represented in digital form as a corresponding rectangular array of numbers. We refer to such a rectangular array of numbers as a digital image where it is understood that it may represent a monochromatic component of a displayed color image or some suitable combination of the monochromatic components.

An image display device has a fixed viewing area which is usually a rectangular viewing screen. Images displayed on the viewing screen often completely fill the viewing screen. Re-sizing of the image means that the image is re-displayed on the viewing screen in such a way that the image is perceived by the HVS to have been horizontally or vertically stretched or compressed. The ratio of the horizontal size of the image after re-sizing to the horizontal size before re-sizing is the horizontal scaling factor. Similarly, the vertical scaling factor is the ratio of the vertical size of the image after re-sizing to the vertical size before re-sizing. Scaling factors greater than unity represent stretching and scaling factors less than unity represent shrinking of a displayed image.

The aspect ratio of a displayed image is the ratio of its width to its height. If the image is resized using equal horizontal and vertical scaling factors, then the resized image will have the same aspect ratio as the original. By using equal horizontal and vertical scaling factors, objects will grow or shrink without changing their shapes and the re-sizing operation will be perceived by the HVS as having caused all objects within the image to have moved closer to or farther away from the viewer.

Resized images may exceed the dimensions of the viewing screen. Thus, some parts of the resized image may lie outside of the viewing screen and may not be visible. A cropped image is that portion of the image that is displayed in the viewing screen.

Zooming is the re-sizing of a set of digitized images or displayed images to create the perception in the HVS that objects within the displayed image are growing or shrinking with time. Zooming creates the illusion that the distances between the viewer and the objects in the displayed image are growing or shrinking.

Smooth zooming is zooming such that the scaling factors increase or decrease sufficiently slowly over the set of displayed images to create the perception in the HVS that objects within the displayed image are growing or shrinking continuously with time during the process of zooming.

If the scaling factors are increasing with time the zooming process is in the zoom-in mode and if the scaling factors are decreasing with time the zooming process is in the zoom-out mode. For example, a smooth zoom in the zoom-in mode can be achieved in 11 successive frames having scale factors, relative to the first frame, of 1.0, 1.1, 1.2 ... 1.8, 1.9 and 2.0, resulting in the final scaling factor of 2.

Prior art methods for re-sizing and zooming digitized images operate directly on the numbers which represent each of the pixels in the displayed image. That is, they operate in the spatial domain.

One prior art method of re-sizing images is the pixel replication method which uses integer scale factors. The pixel replication method simply copies each pixel some integer number of times in both the horizontal and vertical directions. For example, with a scaling factor of 3, each pixel of the original image is replicated to form a corresponding 3×3 square of pixels in the resized image. A primary disadvantage of pixel replication methods is that the jagged staircase effects of the pixelization increase in proportion to the scaling factor. Thus, pixel replication introduces significant and often unacceptable distortion of the image after re-sizing. A further disadvantage of the pixel replication method is that it is limited to enlarging images by integer scaling factors. Therefore, it cannot be used to reduce the size of the image, nor can it be used to re-size an image by non-integer scale factors, such as 1.1, 1.2, etc., as required for smooth zooming operations.

Another prior art method is the pixel sub-sampling method, which is used to reduce the size of images using scaling factors that are the reciprocals of integers, such as ½, ⅓ or ¼. This method implements the scaling factor 1/Q in the horizontal or vertical directions, where Q is an integer, by retaining only one of every Q numbers, or pixels, in the digital image in the respective directions. The pixel sub-sampling method creates undesirable distortions in displayed images. Such distortions lead to the loss of edge definition in objects and are noticeable by the HVS in displayed images that are resized using this method, especially for large values of Q.

Abrupt spatial variations of the intensity of the resized image are especially susceptible to distortion and are therefore objectionable to the HVS. This distortion can be alleviated if the intensity variation between pixels is made to vary smoothly in all directions after pixel replication or before pixel sub-sampling. The prior art includes a variety of methods for achieving the required spatial domain smoothing. These prior art spatial domain methods have a number of disadvantages, including the need for operating directly on each of the pixels in the unscaled spatial domain version of the digital image. Other versions of the image, such as encoded or compressed versions, in which the image is not spatially represented pixel by pixel, cannot be used with the prior art spatial domain smoothing methods.

In the case of pixel replication, the required smoothed image is often obtained by means of a two-dimensional spatial domain low-pass filtering operation that effectively smooths out the spatial intensity variations in the digitized image. Two-dimensional spatial domain low-pass filtering methods vary in sophistication depending upon the level of distortion that can be tolerated in the displayed image. Simple spatial domain weighted averaging of regional pixels can be used to smooth the intensity variations in the pixel-replicated version of the image, thereby reducing the jagged edge effects. More complicated spatial domain filtering methods smooth each number in each row and column of the resized digital image. This may require hundreds of multiplication and addition operations to be performed on each pixel, which may lead to millions of operations for each resized image. For example, if an image of size 512×512 is resized to 4096×4096 (scaling factor of 8) by pixel replication and a smoothing operation requiring 100 multiplication operations per pixel is employed on the resized image, then the total number of multiplication operations that is required for smoothing each resized image is 4096×4096×100. This results in over 1,600,000,000 multiplication operations per resized image.

If the image is cropped to a 512×512 size, then the minimum number of multiplication operations is reduced to 512×512×100, which is over 25,000,000 per cropped image. Accordingly, the prior art methods for the spatial domain reduction of distortion due to pixel replication involves the use of extensive hardware and software resources that operate on a pixel by pixel basis.

In the case of pixel sub-sampling, a two-dimensional low-pass filtering operation is performed on the image prior to sub-sampling to smooth out the intensity variations. This spatial domain smoothing method has the effect of pre-distorting the image to minimize the distortion effects in the resized image following pixel sub-sampling. The effect of this smoothing operation is to blur many objects in the image so that their sharp edges are no longer distinct after pixel sub-sampling. The required spatial domain filtering operations, like those used in pixel replication, vary in sophistication and complexity. When simple weighted averaging is used to achieve this filtering, it is often necessary to use hundreds of multiplication and addition operations per pixel. For example, to re-size a 512×512 image to a 64×64 image (scaling factor of ⅛) by pixel sub-sampling using a smoothing operation that requires 100 multiplication operations per pixel of the resized image, the total number of multiplication operations required for smoothing each resized image is 64×64×100. This results in over 360,000 multiplication operations per resized image of size 64×64. Pre-distorting the original image using this smoothing operation requires 512×512×100 multiplication operations on the original digital image. This method, like the pixel replication method, also requires extensive hardware and software resources that operate on a pixel by pixel basis.

There are prior art methods for re-sizing images in the spatial domain by fractional scaling factors, such as 22/73 or 101/100. This capability is required for smooth zooming and other re-sizing effects. Almost all of the prior art methods involve a combination of the pixel replication and pixel sub-sampling methods described above, along with the appropriate smoothing operations. The prior art methods for fractional scaling factors essentially combine pixel replication and pixel sub-sampling in a single system, which are referred to in the digital signal processing literature as multirate digital systems. Such methods operate on the image in the spatial domain, pixel by pixel, and they employ complicated, computationally intensive digital filtering techniques to smooth out the jagged edges and other distortions in the resized image.

Panning is the cropping of a set of digitized images or displayed images to create the perception in the HVS that all objects within the displayed image are uniformly translated between any two adjacent images in the displayed sequence of images.

Smooth panning is panning such that displacements of objects in successive displayed images are sufficiently small to create the perception in the HVS that all objects within the displayed image are moving continuously with time in the displayed sequence of images.

When objects in displayed images are moving during the zooming or panning processes, the perceptions of zooming and panning are retained by the HVS provided that the movements over time of objects in images are sufficiently slow.

Image compression is the process by which digital images are represented by a fewer number of bits of information.

Image compression allows images to be stored in fewer bits of digital memory and thereby reduces the size of computer files that are required for storing images. Image compression also allows the compressed version of digital images to be transmitted over communication channels at a faster rate than uncompressed images.

Compressed versions of spatial domain images must be decompressed prior to display.

Most image compression methods employ mathematical techniques that transform the spatial domain representation of the image to a corresponding transform domain version of the image that is more suitable for compression. For example, the transform domain version typically employs data that has the mathematical property that it is significantly less correlated than the data in the spatial domain which is a desirable property for subsequent compression. A wide variety of compression methods, including quantization and coding, are routinely employed to compress the transform domain version of the image.

The decompression process attempts to recover the original transform domain version in which case the compression-decompression process is said to be lossless. In practice the decompression algorithms often recovers only an approximation to the original spatial domain image, and the process is said to be lossy.

The transform domain versions of images do not necessarily contain data that corresponds to spatial domain pixels and therefore may not be operated upon by the above mentioned prior art re-sizing and zooming methods to achieve re-sizing and zooming of displayed images.

International standards have been developed for accomplishing compression of digital images. For example, the MPEG 1 and 2 compression standards are the most widely used for digital image sequences while JPEG is commonly used for still images.

These standards use the discrete cosine transform (DCT) to convert spatial domain images to the transform domain and the inverse discrete cosine transform (IDCT) is used to convert the transform domain version to the corresponding decompressed spatial domain image. Prior art methods of re-sizing, zooming or panning displayed images, that have been compressed using the MPEG standards, operate on the spatial domain image.

SUMMARY OF THE INVENTION

The present invention provides a method of re-sizing a spatial domain image by modifying the transform domain method that is used to transform the transform domain version of the image to the spatial domain version of the image. By modifying the transform domain method, there is no need to perform further pixel-by-pixel image re-sizing, zooming or panning operations on the image in the spatial domain. The detrimental effects caused by re-sizing an image in the spatial domain, such as jagged edges, blurring, aliasing or other image degradations, are reduced in the present invention.

The standard transform method, which transforms the image from the transform domain to the spatial domain, is modified. Transformation of the transform domain image, using the Modified Transform Method, produces an altered spatial domain image. These modifications to the transform operation are performed by the Modified Transform Method in such a way as to achieve desirable re-sizing or zooming effects in the altered spatial domain image after transformation.

It is a technical advantage of the present invention to provide a method of modifying the appearance of the spatial domain representation of a digital image by applying a Modified Transform Method to the transform domain version of the image. The re-sized spatial domain image can be achieved by modifying a large number of transformation methods, such as the Inverse Discrete Cosine Transform method, the Inverse Discrete Fourier Transform method and the Inverse Discrete Wavelet Transform method. Furthermore, the invention can be applied to the block images (that is, blocks) used in standard image compression techniques, such as MPEG or JPEG.

It is a further technical advantage of the invention that no further modification of the spatial domain image is required after performing the Modified Transform Domain Method. This precludes the need for extensive pixel-by-pixel modification of the spatial domain image in order to re-size or zoom.

An additional technical advantage of the invention is to provide for modification of digital images without using extensive hardware and software resources. Re-sizing and zooming modification of the spatial domain representation of an image requires expensive and time consuming pixel-by-pixel processing. In the present invention, the spatial domain images created by the Modified Transformation Method are in their re-sized or zoomed form and are capable of being displayed without further modification or processing.

The foregoing has rather broadly outlined the features and technical advantages of the present invention in order that the detailed description of the invention that follows may be better understood. Additional features and advantages of the invention will be described hereinafter which form the subject of the claims of the invention. It should be appreciated by those skilled in the art that the concept and the specific embodiment disclosed may be readily utilized as a basis for modifying or designing other structures for carrying out the same purses of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4A shows a resized image which is too large for the display window;

FIG. 4B shows the resized image of FIG. 4A cropped to fit the display window;

FIG. 4C shows the resized image of FIG. 4A cropped to fit some sub-portion of the display window;

FIG. 5A shows the resized image divided into discrete blocks;

FIG. 5B shows a display window moving with respect to the blocks of the resized image of FIG. 5A;

FIG. 6 illustrates enlarging a digital image using the method of the present invention;

FIG. 7 illustrates shrinking a digital image using the method of the present invention;

DESCRIPTION OF THE PREFERRED EMBODIMENTS

Figure 1A:
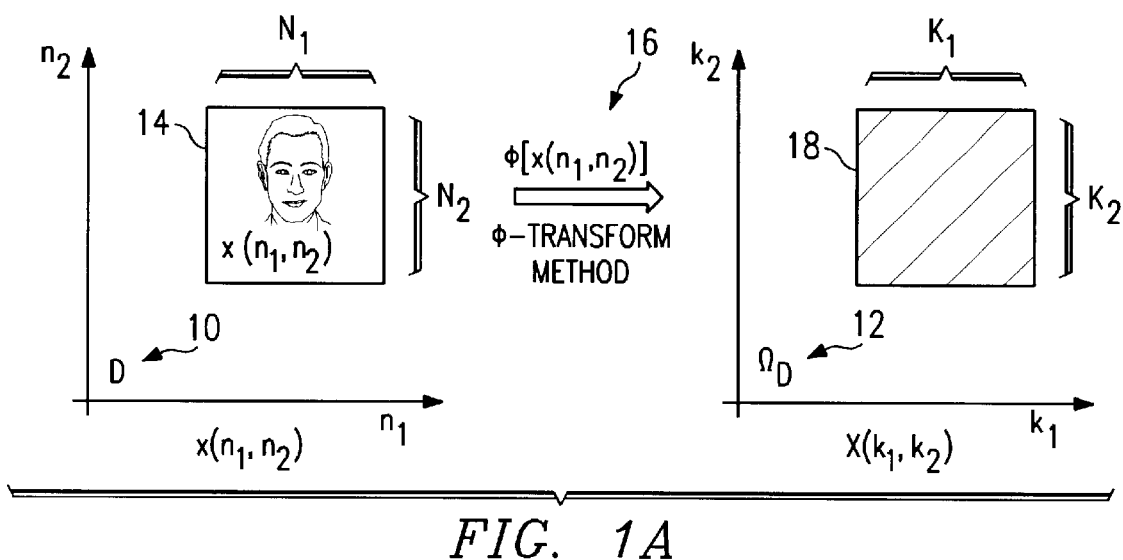
FIG. 1A is a representation of the transformation of an image from the spatial domain to a transform domain and is referred to herein as a $\Phi$-Transform Method.

A digital image is an array of digital numbers wherein each digital number in the array represents a corresponding pixel of the displayed image. Both the digital image and its displayed version are spatial-domain images and may be represented mathematically by a real-valued function $x(n_1, n_2)$ where $n_1$ and $n_2$ are non-negative integers that point to the number in the $n_1^{th}$ column and $n_2^{th}$ row of the digital image array, as shown in FIG. 1A. In the displayed image, $n_1$ and $n_2$ point to the corresponding displayed pixel, for a rectangular digital image of size $N_1$ columns by $N_2$ rows, $0 \leq n_1 \leq (N_1-1)$ and $0 \leq n_2 \leq (N_2-1)$. The spatial-domain is referred to as D 10 in FIG. 1A and contains the digital image 14. We say that $n_1, n_2 \epsilon D$.

The present invention provides a method of re-sizing a digital image $x(n_1,n_2)$ to create a re-sized version $xr(n_1,n_2)$ of the digital image by modifying a Transform Domain Method. By means of the re-sizing method, this invention further provides methods for zooming and panning of digital images and thereby of displayed images. The Method may be used to achieve re-sizing, panning and zooming without operating directly on the spatial domain image.

A set of mathematical operations that transforms a spatial-domain digital image $x(n_1,n_2)$ to a transform domain version $\Phi[(n_1,n_2)]$ of the image is referred to as a $\Phi$-Transform Method if the transform domain data $\Phi[x(n_1,n_2)]$ does not have a one-to-one correspondence with spatial pixels in the spatial domain image $x(n_1,n_2)$. Conversely, a set of mathematical operations that transforms a transform-domain version of an image to a spatial domain version of the image is referred to as a $\Psi$-Transform Method.

The $\Psi$-Transform Method may be applied to the transform domain version of an image $\Phi[x(n_1,n_2)]$ to obtain the spatial-domain image $\Psi[\Phi[x(n_1,n_2)]]$.

If the application of the $\Phi$-Transform Method, followed by the application of the $\Psi$-Transform Method, leads to the original spatial domain digital image $x(n_1,n_2)$, then the k-Transform Method is the Inverse Transform of the $\Phi$-Transform Method and we say that $\Psi=\Phi^{-1}$.

There exists a wide variety of operations on spatial-domain images that transform them from the spatial-domain to a transform-domain. An important class of $\Phi$-Transform Methods yields a transform domain image of the form $X(k_1,k_2)=\Phi[x(n_1,n_2)]$ where $k_1$ and $k_2$ are the so-called transform-domain variables in the transform-domain $\Omega_D$. Such transforms may be written in terms of their basis functions $b(k_1,k_2,n_1,n_2)$, in the form $$X(k_1 k_2) = \sum_{n_1} \sum_{n_2} x(n_1, n_2) b(k_1, k_2, n_1, n_2),$$

and is summarized in FIG. 1A where the transform operation 16 is shown yielding a transform-domain representation $X(k_1,k_2)$ of the digital image $x(n_1,n_2)$. In FIG. 1A, $X(k_1,k_2)$ 18 is of size $K_1 \times K_2$ and the transform-domain $\Omega_D$ 12 is shown.

The basis function $b(k_1,k_2,n_1,n_2)$ is independent of the digital image $x(n_1,n_2)$, but it does depend on the type of transform that is selected. For example, the Discrete Fourier Transform and the family of Discrete Cosine Transforms have different and particular basis functions. Also, the basis functions of the Discrete Fourier Transform and the Inverse Fourier Transform are different.

The transform-domain image $X(k_1,k_2)$ is an image that is not usually viewed or displayed because the values of a transform-domain image $X(k_1,k_2)$ do not correspond to pixels in the displayed version of the digital image.

There exists a corresponding set of $\Psi$-Transform Methods that operate on transform domain images to transform them from the transform domain to the spatial-domain. An important class of $\Psi$-Transform Methods yields a spatial domain image of the form $x(n_1,n_2)=\Psi[X(k_1,k_2)]$ where $n_1$ and $n_2$ are the so-called spatial-domain variables in the spatial-domain D. Such transforms may be written in terms of their basis functions $b(k_1,k_2,n_1,n_2)$ in the form $$x(n_1 n_2) = \sum_{k_1} \sum_{k_2} X(k_1, k_2) b(k_1, k_2, n_1, n_2),$$

Figure 1B:
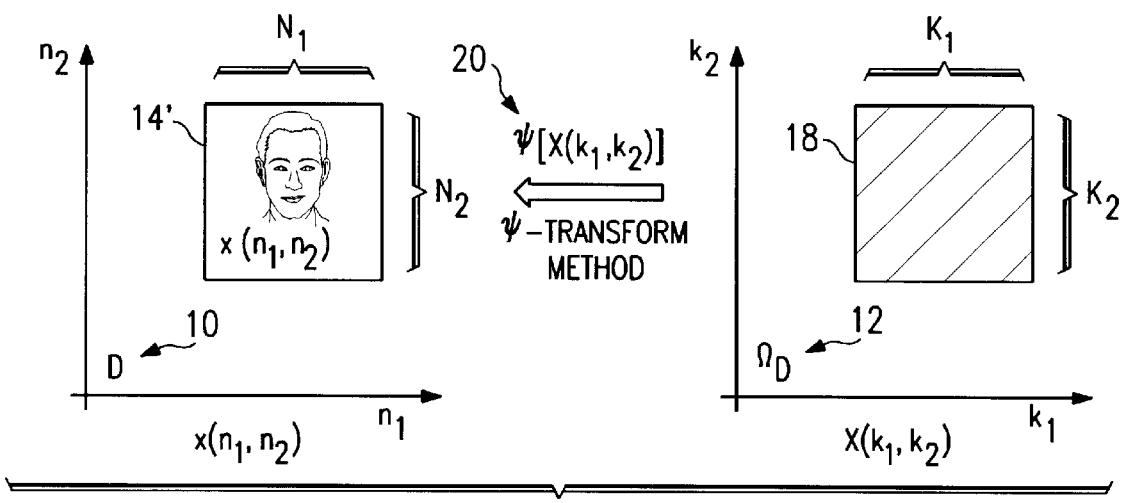
FIG. 1B is a representation of the transformation of an image from a transform domain to the spatial domain and is referred to herein as a $\Psi$-Transform Method.

As summarized in FIG. 1B, the $\Psi$-Transform Method $\Psi[X(k_1,k_2)]$ 20 is shown yielding a spatial-domain representation of the digital image $x(n_1,n_2)$ 14'. If the operations in FIGS. 1A and 1B are applied in sequence and images 14 and 14' are identical, then $\Psi[X(k_1,k_2)]$ is the inverse transformation of $\Phi[x(n_1,n_2)]$ and therefore $\Psi=\Phi^{-1}$.

In the prior art, a re-sized displayed image is achieved by operating on the spatial-domain digital image, employing methods that operate on each number in the spatial-domain array of the digital image 14' in FIG. 1B. As further described above, the result of these prior art methods is that a very large number of arithmetic operations are required to avoid undesirable jagged edges and other image distortions that result from the down-sampling and up-sampling operations which are required by spatial domain re-sizing.

The present re-sizing invention avoids the requirements for spatial-domain operations on each number in the spatial-domain array $x(n_1,n_2)$ 14' and also avoids the need for the associated spatial-domain smoothing operations. The present invention is to modify the $\Psi$-Transform Method and is therefore referred to as the Modified $\Psi$-Transform Method. Upon applying the Modified $\Psi$-Transform Method to the transform-domain image $X(k_1,k_2)$ the required re-sized spatial-domain digital image $xr(n_1,n_2)$ is created and may be displayed.

Figure 2:
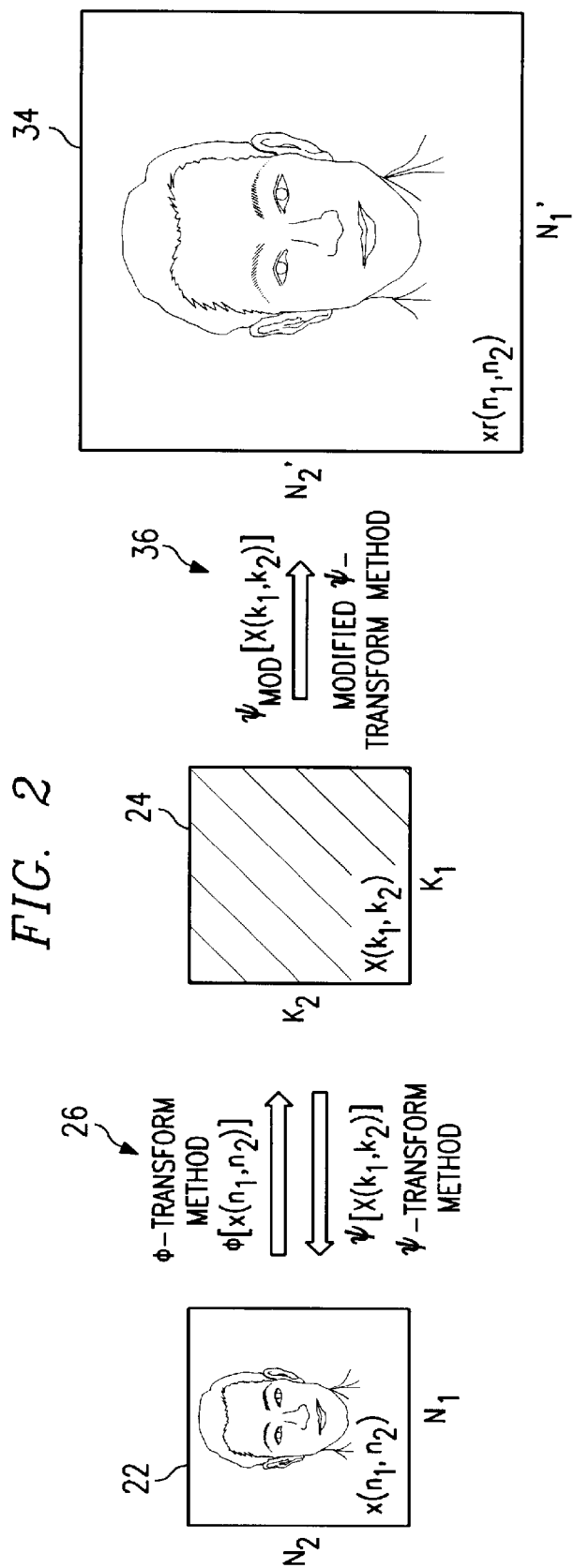
FIG. 2 shows the results of performing a $\Phi$-Transform Method, a $\Psi$-Transform Method and a Modified $\Psi$-Transform Method.

FIG. 2 illustrates the operation of the preferred embodiment of the re-sizing method of the present invention. Image $x(n_1,n_2)$ 22 represents the spatial-domain digital image prior to re-sizing. Images 22, 24 and 34 may be entire displayed images or sub-image regions of the displayed image. If the sub-image region is spatially-rectangular, it is an image-block or block. The transform-domain image $X(k_1,k_2)$ 24 is in the transform domain $\Omega_D$. The unmodified $\Psi$-Transform Method may be employed as an inverse transform $\Psi=\Phi^{-1}$ to convert the transform-domain image $X(k_1,k_2)$ 24 back to the original spatial-domain digital image 22.

By the preferred re-sizing embodiment of this invention, a Modified $\Psi$-Transform Method 36 is applied to the transform domain image $X(k_1,k_2)$ 24 to create the re-sized spatial-domain digital image $xr(n_1,n_2)$ 34 where the Modified $\Psi$-Transform Method is written $$\Psi_{MOD}[X(k_1,k_2)]$$

and where $\Psi_{MOD}[X(k_1,k_2)]$ 36 is shown in FIG. 2.

The Modified $\Psi$-Transform Method is any set of modifying operations $\Psi MOD[X(k_1,k_2)]$ on any data or algorithms of the unmodified Ψ-Transform Method Ψ[X(k₁,k₂)] that causes the image xr(n₁,n₂) 34 to be a predetermined re-sized version of the digital image x(n₁,n₂) 22. Such operations include, but are not limited to, changing the size of the data array X(k₁,k₂) 24 by augmenting the array with additional data and also include, but are not limited to, modifying the parameters of the transformation, such as its basis functions.

The data points of the transform-domain image X(k₁,k₂) 24 may be complex numbers, depending on the selected Φ-Transform Method.

A preferred embodiment of this invention is to modify the Ψ-Transform Method by modifying the basis functions b(k₁,k₂,n₁,n₂) to create a modified set of basis functions b$_{MOD}$(k₁,k₂,n₁,n₂) and, in particular, such that $$b_{MOD}(k_1, k_2, n_1, n_2) = b\left(\frac{k_1}{s_1}, \frac{k_2}{s_2}, n_1, n_2\right)$$

where b$_{MOD}$(k₁,k₂,n₁,n₂) are the modified basis functions and s₁ and s₂ are real numbers that are called the horizontal and vertical scaling factors, respectively. The basis functions are modified as part of the Modified Ψ-Transform Method.

For example, if the basis functions are of the form $$b(k_1, k_2, n_1, n_2) = \cos\left(\frac{(2n_1 + 1)k_1\pi}{2N_1}\right)\cos\left(\frac{(2n_2 + 1)k_2\pi}{2N_2}\right)$$

then the modified basis functions are of the form $$b_{MOD}(k_1, k_2, n_1, n_2) = \cos\left(\frac{(2n_1 + 1)\left(\frac{k_1}{s_1}\right)\pi}{2N_1}\right)\cos\left(\frac{(2n_2 + 1)\left(\frac{k_2}{s_2}\right)\pi}{2N_2}\right)$$

When the value s₁ is greater than unity, the above scaling of the basis functions causes the re-sized image xr(n₁,n₂) 34 to be stretched in the horizontal direction relative to x(n₁,n₂) 22. When the value of s₁ is less than unity, the re-sized image xr(n₁,n₂) 34 is shrunk in the horizontal direction relative to x(n₁,n₂) 22. Similarly, s₂ achieves stretching or shrinking of xr(n₁,n₂) 34 in the vertical direction, depending on whether s₂ is greater or less than unity.

If s₁=s₂ then the stretching or shrinking of xr(n₁,n₂) 34 relative to x(n₁,n₂) 22 occurs without altering the aspect ratio of the re-sized image relative to the original and without altering the perceived shapes of objects in displayed versions of those images.

Figure 3:
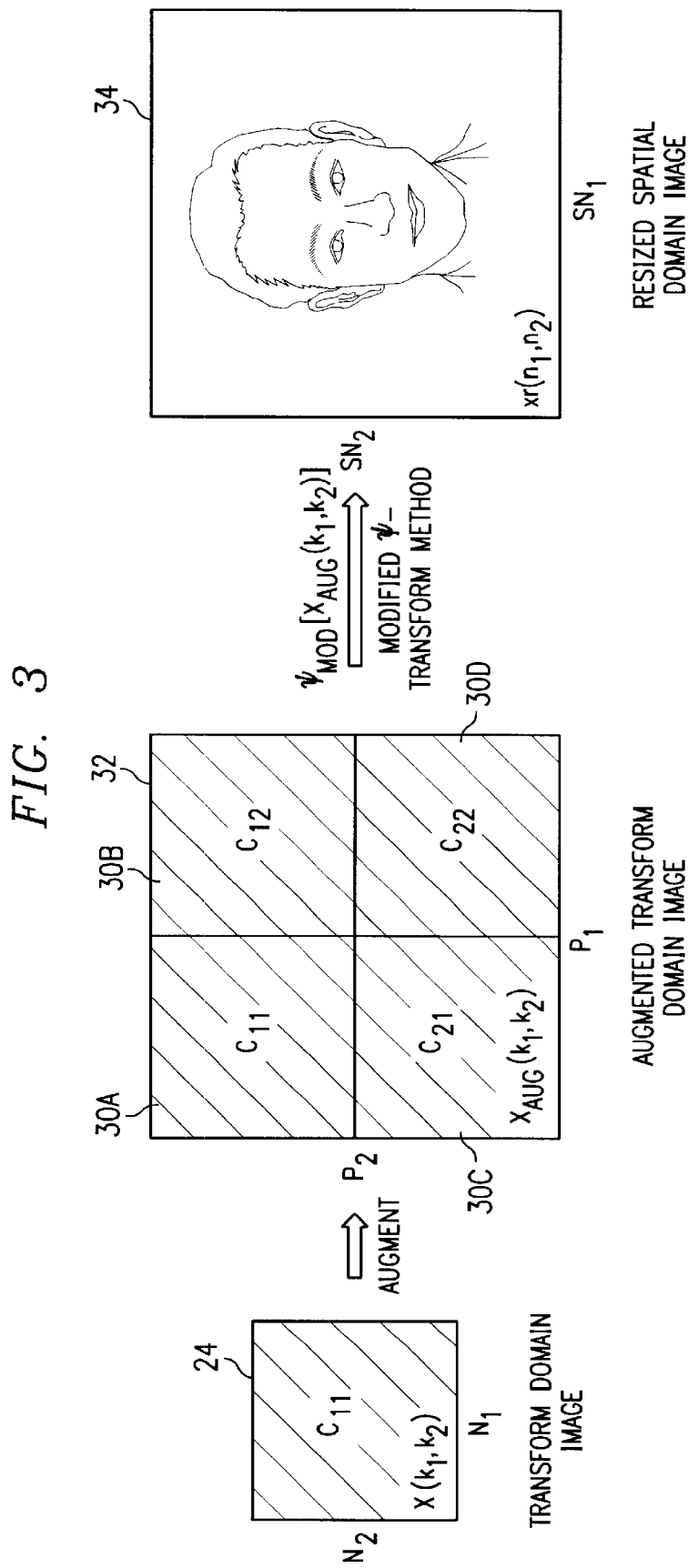
FIG. 3 shows a Modified $\Psi$-Transform Method using an augmented transform domain image.

A further modification to the Ψ-Transform Method related to re-sizing images, for the case when s₁ and s₂ are greater than unity, is to increase the size of the transform-domain image X(k₁,k₂) 24 by generating additional synthetic data points so that the overall size of the augmented transform-domain image X(k₁,k₂) 24 and the re-sized spatial domain image xr(n₁,n₂) 34 are predetermined. In FIG. 3, the original array of data points C11 30A of the Φ-Transform Method is augmented by additional generated arrays C12 30B, C21 30C and C22 30D of synthetic data points that serve to modify and increase the size of the transform-domain image X(k₁,k₂) 24 and create the modified transform-domain image X$_{AUG}$(k₁,k₂) 32. The synthetic data in the additional generated arrays C12 30B, C21 30C, and C22 30D may be generated by means of operations on the data points in C11 30A or by some other means or they may be set to zero value.

The sizes of rectangular arrays C12 30B, C21 30C, and C22 30D may be chosen so that the number of rows P₁ of 32 satisfies $$P_1 \geq s_1 N_1$$

and the number of columns P₂ of 32 satisfies $$P_2 \geq s_2 N_2$$

For example, if N₁=N₂=8 for an image-block and the desired scaling factors are s₁=s₂=1.5, then we choose P₁,₂≥12 for the size of the image-block xr(n₁,n₂)34. If s₁N₁ is an integer, then the number of columns P₁ of image 32 may be chosen equal to s₁N₁ and if s₂N₂ is an integer then the number of rows P₂ of image 32 may be chosen equal to s₂N₂. The transform-domain image 32 is referred to as the Augmented Transform Domain Image and denoted X$_{AUG}$(k₁,k₂).

To obtain the re-sized spatial domain image xr(n₁,n₂) 34, the Augmented Transform Domain image X$_{AUG}$(k₁,k₂) 32 of transform domain data is transformed using a Modified Ψ-Transform which employs the modified basis functions b$_{MOD}$(k₁,k₂,n₁,n₂). The Modified Ψ-Transform can then be expressed mathematically in the form $$xr(n_1 n_2) = \sum_{k_1}\sum_{k_2} b_{MOD}(k_1, k_2, n_1, n_2) X_{AUG}(k_1, k_2)$$

where k₁,k₂∈Ω$_D$, implying that the summation over the transform domain variables k₁,k₂ is over a suitably chosen region of the transform domain Ω$_D$. By using the above Modified Ψ-Transform Method to obtain re-sized spatial domain image xr(n₁,n₂) 34, jagged edges and other undesirable aliasing effects are avoided and there is no need for extensive smoothing operations on the spatial domain image xr(n₁,n₂) 34 to reduce jagged edges and other distortion effects in tie re-sized image.

For example, a spatial-domain image x(n₁,n₂) 14 of size N₁=N₂=128 may be re-sized by scaling factors s₁=s₂=2 to obtain a re-sized image xr(n₁,n₂) 34 of size P₁=P₂=256 by operating on the transform domain image X(k₁,k₂) 24. The data array C11 30A represents the array of X(k₁,k₂) 24 and is of size 128×128 for the unmodified Inverse Discrete Cosine Transform. The augmented arrays C12 30B, C21 30C and C22 30D may be chosen as zero-valued arrays of size 128×128 (represented as "0" below) so that the augmented array X$_{AUG}$(k₁,k₂) 32 is given by $$X_{AUG}(k_1, k_2) = \begin{bmatrix} C_{11} & C_{12} \\ C_{21} & C_{22} \end{bmatrix} = \begin{bmatrix} X(k_1, k_2) & 0 \\ 0 & 0 \end{bmatrix}$$

which is of size 256×256. The Modified Ψ-Transform Method is selected as the Inverse Discrete Cosine Transform operation on this Augmented Transform Domain Image X$_{AUG}$(k₁,k₂) using the following modified basis functions with s₁=s₂=2

$$b_{MOD}(k_1, k_2, n_1, n_2) = \cos\left(\frac{(2n_1 + 1)\left(\frac{k_1}{s_1}\right)\pi}{2N_1}\right)\cos\left(\frac{(2n_2 + 1)\left(\frac{k_2}{s_2}\right)\pi}{2N_2}\right)$$

so that the Modified Ψ-Transform Method is $$xr(n_1, n_2) =$$

-continued $$\sum_{k_1=0}^{P_1=255}\sum_{k_2=0}^{P_2=255} X_{AUG}(k_1,k_2)\cos\left(\frac{(2n_1+1)\left(\frac{k_1}{s_1}\right)\pi}{2N_1}\right)\cos\left(\frac{(2n_2+1)\left(\frac{k_2}{s_2}\right)\pi}{2N_2}\right)$$

It is an advantage of this invention that objects in the re-sized image $xr(n_1,n_2)$ 34 do not exhibit the distortion effects of pixel replication and the edges of objects are visually smooth. This is achieved without spatial-domain smoothing filters.

The above example can be implemented with small block images. For example, the original image $x(n_1,n_2)$ could be a block image of size 8×8 and, with $s_1=s_2=2$, the re-sized image block would be of size 16×16. The total re-sized and displayed image could be composed of many such re-sized image blocks.

FIG. 4A illustrates the case when image 42 is re-sized such that the re-sized image $xr(n_1,n_2)$ 44 is too large for the display window 46. A similar problem occurs if the image is to be used in a desired sub-area of the display window 46. In some cases, the re-sized image may fit within the overall display area but may be too large for the desired sub-area of the display. In FIG. 4A, the original image $x(n_1,n_2)$ 42 of size $N_1 \times N_2$ fits within the display window 46 which is of size $W_1 \times W_2$. Display window 46 can represent either the entire area of a display or a sub-area of the display. Re-sized image $xr(n_1,n_2)$ 44 is an enlarged version of image 42 produced using the Modified Ψ-Transform Method with scaling factors $s_1$ and $s_2$ as disclosed above. Re-sized image 44 is of size $R_1 \times R_2$, where $R_1=s_1 N_1$ and $R_2=s_2 N_2$. In this example, re-sized image 44 is larger than display window 46, causing portions of the enlarged image to fall outside of display window 46. FIG. 4B shows cropped image $xcr(n_1, n_2)$ 48 which comprises a portion of re-sized image 44, such that the cropped image 48 fits within the display window 46. The cropped image 48 is of size $CR_1 \times CR_2$ where $CR_1 \approx N_1$ and $CR_2 \approx N_2$ so that cropped image 48 approximates the dimensions of original image 42. As shown in FIG. 4C, re-sized image 44 also may be cropped so that the dimensions, $CR_1^1$ and $CR_2^1$, of cropped image 50 are not equivalent to those of original image 42. In this case, cropped image 50 can be of any suitable size for viewing on a sub-portion of the display, such as display window 86 of FIG. 8, which shows a zoomed-in version 84' of image 84.

In cases where the resized image is larger than the display window, instead of cropping the resized image, it may be desirable to pan the resized image so that sequential portions of the entire resized image may be viewed in the display window.

As shown in FIG. 5A, resized image 44 can consists of blocks 52 which correspond to discrete spatial regions of resized image 44. Blocks 52 are of dimension $B_1 \times B_2$ and may be of various sizes, from single pixels to multiple pixel rows and columns.

FIG. 5B shows display window 46 panning over resized image 44.

Display window 46 covers a portion of the blocks 52 of the resized image 44.

Blocks 52 which are within display window 46 can be viewed by a user. The resized image 44 is panned by sequentially moving blocks 52 across the display window 46. For pixel-level panning, blocks 52 correspond to individual pixels of resized image 44. The image is panned by sequentially adding one row or column of pixels to an edge 54 of display window 46 and removing one row or column of pixels from the opposite edge 56 of display window 46.

A shift vector 58, represented as $d_{pan}=[d_{horiz} d_{vert}]$ pixels/frame, defines the movement of re-sized image $xr(n_1,n_2)$ 44 with respect to display window 46, where $d_{horiz}$ is the number of blocks in the horizontal dimension and $d_{vert}$ is the number of pixels in the vertical dimension.

For pixel-level panning, $d_{horiz}=-1,0$ or $+1$ and $d_{vert}=-1,0$ or $+1$, so that the display window moves one row and column per frame. Resized image 44 can also be panned using multiple pixels. In multiple-pixel-level panning, multiple rows and columns of pixels may be added and removed at the edges, so that the components of the shift vector are:

$$d_{horiz}=-m_{horiz}, 0 \text{ or } +m_{horiz} \text{ and } d_{vert}=-m_{vert}, 0 \text{ or } +m_{vert},$$

where $m_{horiz}$ and $m_{vert}$ represent multiple columns and rows of pixels. In block-level panning $m_{horiz}=M_1$, the horizontal block size, and $m_{vert}=M_2$, the vertical block size.

Panning can be accomplished using the Modified Ψ-Transform Method disclosed above. By identifying groups of blocks in the transform domain image which are within or partially within the display window, the Modified Ψ-Transform Method is applied to each of those blocks to produce that portion of the resized image 44. A second group of blocks is then identified which corresponds to those blocks which will overlap the display window in the next frame after the display window is moved by the appropriate shift vector. The Modified Ψ-Transform Method is then applied to the second group of blocks to produce a shifted portion of the resized image 44.

The cropping and panning functions described above will be understood to apply to images which have been resized using scale factors that are greater than, less than or equal to unity. Additionally, the re-sizing, panning and cropping functions may be applied to images in real-time. For example, an image may be received by a digital system via an opto-electronic transducing device, such as a video camera, the image may then be compressed using an appropriate MPEG standard. The compressed image can then be inverse transformed using a Modified Ψ-Transform Method to achieve a displayed image which has been resized, zoomed, panned or cropped according to the present invention.

FIG. 6 illustrates the re-sizing method of the present invention for the case in which the original spatial domain image $x(n_1,n_2)$ 600 is enlarged by a non-integer scale factor. In this example, the scale factor is $s_1=s_2=1.5$. The re-sizing shown in FIG. 6 also includes an example of a re-sizing operation that is combined with a cropping operation to produce the final resized image $xcr(n_1,n_2)$ 602. Original image 600 is transformed to the transform domain using the Discrete Cosine Transform $\Phi[x(n_1,n_2)]$ 604 to produce transform domain image $X(k_1,k_2)$ 606. This transformation is represented mathematically as:

$$X(k_1,k_2) = \sum_{n_1=0}^{7}\sum_{n_2=0}^{7} x(n_1,n_2)\cos\left(\frac{(2n_1+1)\pi k_1}{(2)(8)}\right)\cos\left(\frac{(2n_2+1)\pi k_2}{(2)(8)}\right)$$

where the original image size corresponds to $N_{1,2}=8$ in this example.

Transform-domain image 606 is then augmented with synthetic data points DP 608 to create augmented transform image $X_{AUG}(k_1,k_2)$ 610. Augmented transform image 610 is of size $P_1 \times P_2$, where $P_{1,2} \geq s_{1,2} N_{1,2}$. For a scale factor of 1.5 and an original spatial domain of size 8×8, $P_{1,2}$ must be greater than or equal to $(1.5)(8)=12$. In this example, instead of using an augmented transform image of size 12×12, the augmented transform image 610 is of size 16×16. This satisfies the requirement $P_{1,2} \geq 12$ and may be chosen because fast transforms exist for this size. A value of $P_{1,2} \geq 12$ may also be selected due to consideration of such factors as the hardware or software used by the system.

Augmented transform image 610 is then transformed using a Modified $\Psi$-Transform Method $\Psi_{MOD}[X_{AUG}(k_1,k_2)]$ 612. Modified $\Psi$-Transform Method 612 is derived by scaling the basis functions $b(k_1,k_2,n_1,n_2)$ of the unmodified $\Psi$-Transform Method $\Psi[X(k_1,k_2)]$ by scale factors $s_{1,2}$. This creates modified basis function $$b_{MOD}(k_1, k_2, n_1, n_2) = b\left(\frac{k_1}{s_1}, \frac{k_2}{s_2}, n_1, n_2\right).$$

Applying the Modified $\Psi$-Transform Method 612 to the Augmented Transform Domain Image 610 directly yields the re-sized image $xr(n_1,n_2)$ 614 in the spatial domain. For this example, using a modified Inverse Discrete Cosine Transform operation as the Modified $\Psi$-Transform Method, the inverse transformation of the augmented image 610 is represented mathematically as:

$$xr(n_1, n_2) = \sum_{k_1=0}^{15} \sum_{k_2=0}^{15} X_{AUG}(k_1, k_2) \cos\left(\frac{(2n_1+1)\pi(k_1/1.5)}{(2)(8)}\right) \cos\left(\frac{(2n_2+1)\pi(k_2/1.5)}{(2)(8)}\right)$$

Resized image 614 is of size 16×16 and includes replicated borders 616 and 618 which result from augmented image 610 being larger than size 12×12. A 12×12 augmented transform image would correspond to the scale factor $s_{1,2}$=1.5. However, by choosing an augmented image 610 of a larger size, an excess amount of resized image is created following the Modified $\Psi$-Transform Method. This excess image that is contained in borders 616 and 618 can be cropped to give cropped resized image 602 of size 12×12, corresponding to a 1.5 scaling of the original 8×8 image 600.

Similarly, FIG. 7 illustrates the re-sizing method of the present invention for the case in which the original spatial domain image $x(n_1,n_2)$ 700 is reduced by a non-integer scale factor to create the final cropped and resized image $xcr(n_1, n_2)$ 702. In this example, the scale factor is ¾. Original image 700 is transformed using transform operation $\Phi[x(n_1, n_2)]$ 704 to give transform image $X(k_1,k_2)$ 706. Since this re-sizing is not an enlargement, transform image 706 does not have to be augmented. Instead, the Modified $\Psi$-Transform Method $\Psi_{MOD}[X(k_1,k_2)]$ 708 is applied directly to transform image 706 to give resized image $xr(n_1,n_2)$ 710.

Resized image 710 contains excess image in borders 712 and 714 due to the scaling of the Modified $\Psi$-Transform Method 708. By cropping resized image 710 to remove excess border 712 and 714, cropped and resized image $xcr(n_1,n_2)$ 702 is created. Image 702 corresponds to a ¾ scaling of original image 700.

Figure 8:
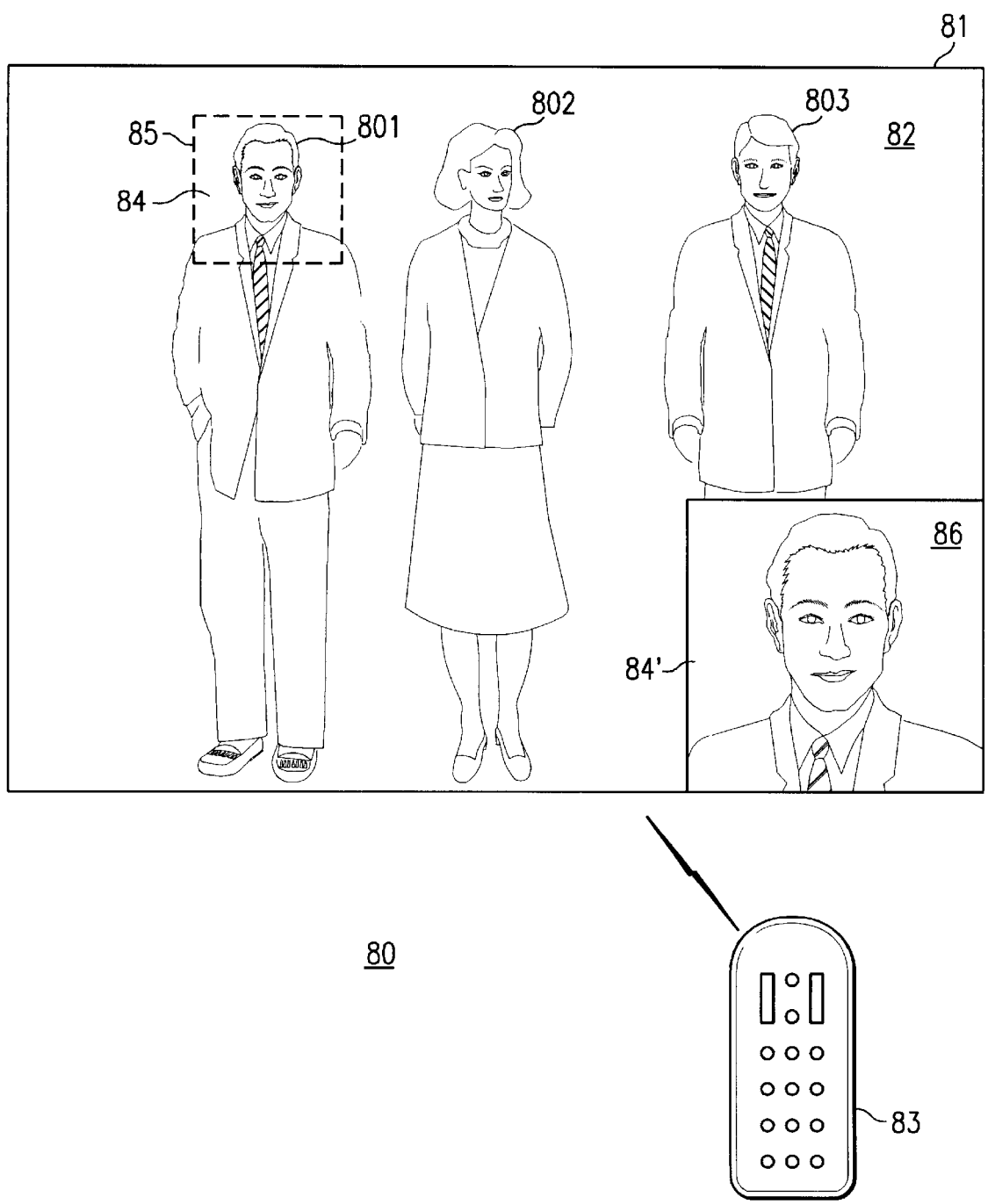
FIG. 8 shows a television viewing system having viewer control.

FIG. 8 shows a system 80 in which a viewing device 81, such as a television or personal computer, has a picture 82 with a plurality of images 801, 802 and 803. A user (not shown) using a remote control 83 or other device, such as a computer mouse, can select a particular image for further zooming. For example, portion 84 of image 82 is selected by adjusting outline 85. This selected image can then be displayed on the screen in place of image 82 or, optionally, in a separate window 86. The image displayed in window 86 can then be resized or zoomed in or out. As discussed above, the viewer could also elect to pan the image of screen 82 (or of screen 86) either row-by-row, column-by-column, block-by-block or in a combination of these.

Although the present invention and its advantages have been described in detail, it should be understood that various changes, substitutions and alterations can be made herein without departing from the spirit and scope of the invention as defined by the appended claims.

What is claimed is:

1. A system for displaying multiple images comprising:
   means for displaying an image;
   means for selecting a portion of said displayed image; and
   means for concurrently displaying, on said display means, the image and the selected portion, wherein said selected portion is modified using a Modified Transform Method, wherein said Modified Transform Method is associated with transforming a transform domain image to a spatial domain image and includes a plurality of synthetic data points.

2. The system of claim 1, wherein said means for selecting a portion of the image comprises:
   a television remote control.

3. The system of claim 1, wherein said means for selecting a portion of the image comprises:
   a computer pointing device.

4. The system of claim 1, wherein said modified selected portion has been resized using said Modified Transform Method.

5. The system of claim 1, wherein said displayed selected portion has been panned using said Modified Transform Method.

6. The system of claim 1, wherein said displayed selected portion has been zoomed-in using said Modified Transform Method.

7. The system of claim 3, wherein said displayed selected portion has been zoomed-out using said Modified Transform Method.

8. A method of modifying a digital image by array operations, wherein the digital image is represented by data stored in a first array having N columns and M rows as spatial domain information, wherein said digital image is to be scaled by a scaling factor $s_1$ in the horizontal direction and by a scaling factor $s_2$ in the vertical direction, comprising the steps of:
   transforming data in the first array to a frequency domain via a first array operation to produce a second array, wherein said first array operation includes utilizing basis functions of the form $b(k_1, k_2, n_1, n_2)$, wherein $k_1$ and $k_2$ are elements of the frequency domain, and wherein $n_1$ and $n_2$ are elements of the spatial domain;
   modifying the second array to produce a third array having X columns and Y rows as frequency domain information, wherein at least one of the following conditions are met: $X \neq N$ and $Y \neq M$, and wherein scaling of the digital image does not occur in the modifying step; and
   transforming data in the third array into spatial domain information via a modified array operation, said modified array operation being associated with basis functions of the form $b(k_1/s_1, k_2/s_2, n_1, n_2)$, and wherein the modified array operation is not the inverse of the first array operation.

9. The method of claim 8 wherein said step of modifying includes adding synthetic data points to the second array.

10. The method of claim 8 wherein said step of transforming data in the third array produces a fourth array, said method further comprising the step of:

cropping data in the fourth array when at least one of $s_1$ and $s_2$ is less than one.

11. The method of claim 8 wherein at least one of the following conditions need not be met by said modifying: $X=s_1N$ and $Y=s_2M$.

12. A system for modifying a digital image by array operations, wherein the digital image is represented by data stored in a first array having N columns and M rows as spatial domain information, wherein said digital image is to be scaled by a scaling factor $s_1$ in the horizontal direction and by a scaling factor $s_2$ in the vertical direction, comprising the steps of:

means for transforming data in the first array to a frequency domain via a first array operation to produce a second array, wherein said first array operation includes utilizing basis functions of the form $b(k_1, k_2, n_1, n_2)$, wherein $k_1$ and $k_2$ are elements of the frequency domain, and wherein $n_1$ and $n_2$ are elements of the spatial domain;

means for modifying the second array to produce a third array having X columns and Y rows as frequency domain information, wherein at least one of the following conditions are met: $X \neq N$ and $Y \neq M$, and wherein scaling does not occur in the modifying step; and means for transforming data in the third array into spatial domain information via a modified array operation, said modified array operation being associated with basis functions of the form $b(k_1/s_1, k_2/s_2, n_1, n_2)$, and wherein the modified array operation is not the inverse of the first array operation.

13. The system of claim 12 wherein said means for modifying includes adding synthetic data points to the second array.

14. The system of claim 12 wherein said means for transforming data in the third array produces a fourth array, said system further comprising:

means for cropping data in the fourth array, wherein said means for cropping operates when at least one of $s_1$ and $s_2$ is less than one.

15. The system of claim 12 wherein at least one of the following conditions is met: the value of X is greater than $s_1N$ and the value of Y is greater than $s_2M$.

* * * * *

UNITED STATES PATENT AND TRADEMARK OFFICE
CERTIFICATE OF CORRECTION

PATENT NO.    : 6,456,745 B1
DATED         : September 24, 2002
INVENTOR(S)   : Leonard T. Bruton et al.

It is certified that error appears in the above-identified patent and that said Letters Patent is hereby corrected as shown below:

Column 7,
Line 33, delete "ɸ[(n$_1$,n$_2$)]" and insert -- ɸ[x(n$_1$,n$_2$)] -- therefor.
Line 46, delete "k" and insert -- Ψ -- therefor.
Line 56, following "," insert -- where k$_1$k$_2$ ∈ Ω$_D$ -- therefor.

Column 8,
Line 18, following "," insert -- where n$_1$, n$_2$ ∈ D. -- therefor.
Line 28, delete "Ψ=$^{-1}$." and insert -- Ψ=ɸ$^{-1}$. -- therefor.
Line 38, delete "," between re-sizing and invention.

Column 9,
Line 55, delete "ɸ" and insert -- Ψ -- therefor.

Column 11,
Line 31, delete "R$_2$s$_2$N$_2$" and insert -- R$_2$=s$_2$N$_2$ -- therefor.

Column 12,
Line 2, delete "defmes" and insert -- defines -- therefor.

Signed and Sealed this

Twenty-fifth Day of February, 2003

JAMES E. ROGAN
*Director of the United States Patent and Trademark Office*